Figure 1:
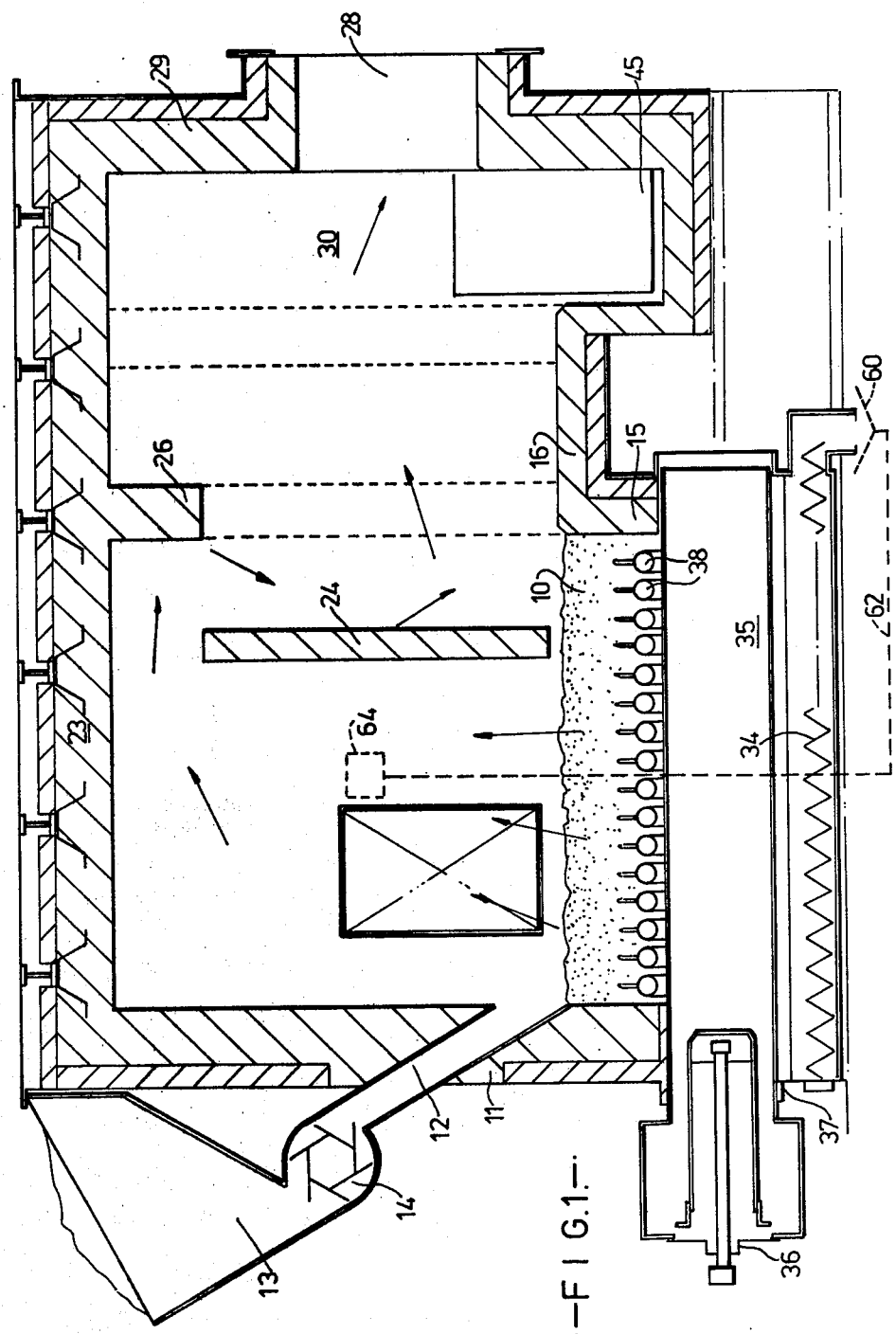

United States Patent [19]

Dawson

[11] 4,268,244
[45] May 19, 1981

[54] FLUID BED FURNACES
[75] Inventor: Harry Dawson, Rochdale, England
[73] Assignee: G. P. Worsley & Company Limited, England
[21] Appl. No.: 26,383
[22] Filed: Apr. 2, 1979
[51] Int. Cl.³ .............................................. F23D 19/02
[52] U.S. Cl. .................................... 431/170; 122/4 D
[58] Field of Search .................. 431/170, 7; 122/4 D; 432/58

[56] References Cited
U.S. PATENT DOCUMENTS

| | | | |
|---|---|---|---|
| 1,133,245 | 3/1915 | Johnson | 431/170 |
| 3,360,867 | 1/1968 | Sanderson | 432/58 |
| 3,826,015 | 7/1974 | Kuroyama | 432/58 |

Primary Examiner—Carroll B. Dority, Jr.
Attorney, Agent, or Firm—William A. Drucker

[57] ABSTRACT

A fluid-bed furnace has one or more combustion chambers containing a fluidizable bed 10 of particulate material. At least adjacent pairs of combustion chambers are shown to share a common exhaust gas outlet system 30. For the or each combustion chamber there is an in-bed removable chamber 35 for housing a bed preheating burner 36 and supplying fluidizing combustion promoting gas via transverse feed pipes 38, usually equipped with upstanding outlet heads. Bed material support is by a V- or U-section trough 32 also at least partially accommodating the chamber 35 and a material extraction feed 34.

12 Claims, 3 Drawing Figures

FLUID BED FURNACES

The invention relates to fluidised bed furnaces where combustion promoting gas, normally air, is forced through and "fluidises", that is maintains in motion, a bed of particulate material including or to which is added combustible fuel, normally solid such as coal, or even liquid fuel such as oil.

Prior to introduction of fuel, beds of such furnaces require their incombustible particulate material to be fluidised and heated at least to the combustion temperature of the fuel to be added. From the point of view of simplicity of furnace construction, this preheating is probably most conveniently done by burners, say oil burners, in the combustion chamber above the bed. However, from the point of view of efficiency, the preheating is best done from below or within the bed material, but this does lead to more complex structures that are less easy to repair and maintain. In an attempt to facilitate that latter, it is proposed herein that a chamber be provided within the bed and extending from one end thereof both to house a preheating auxiliary or alternative main burner, say an oil burner, and to supply combustion promoting gas to a discharge arrangement therefor within the bed material and above the said chamber. The burner is then conveniently mounted to extend from said one end from which it, and even the chamber as a whole, may be readily withdrawn.

Preferably, the chamber is of elongate cylindrical form and extends the length of an elongate bed. Then, the gas discharge arrangement into the bed may comprise a plurality of feed pipes of ducts extending transversely of that cylindrical chamber with a communication pipe or duct thereto and a plurality of discharge openings or heads spaced along their length.

It is also proposed herein that two or more combustion chambers each equipped with their preheating and combustion gas discharge systems be provided in generally side-by-side relation. Then, within an overall enclosure of refractory material, preferably externally insulated, one or more vertical partitions may conveniently define the combustion chambers to either side thereof. In a preferred embodiment, a dual-chamber furnace has a single central partition wall between the two chambers with access thereto for repair or maintenance purposes from side walls of the overall enclosure.

Another proposal of this invention is to provide a pre-heating burner housing and combustion promoting gas distribution plenum chamber in a downwardly V- or U-shaped section trough below the bed proper. Such a trough of that section may be provided, at its lowest part and chamber, with an extraction arrangement, such as a worm screw, for the bed material and particularly for removal of ash, heavy incidental incombustibles of the fuel, and agglomorated material that sinks through the bed material. Clearly, a worm screw-type extraction element may conveniently extend parallel with the pre-combustion burner housing of gas plenum chamber and extend at least between ends of the furnace bed.

The or each combustion chamber conveniently has its bed extend beyond an internal baffle or wall, usually vertical, forcing exhaust gases to rise over its top, preferably with a subsequent forced downturn thereof towards a furnace exhaust, so that at least some entrained solid material from the bed will drop out on the rise or fall of the exhaust gas and back onto the bed material itself. For a plural, preferably dual, chamber furnace as mentioned above, a single furnace exhaust may be provided in an end chamber common to the furnace chambers.

Another proposal hereof concerns material extraction including coarse or agglomerated combustion residues from a low part of the bed preferably with return of fine material to the combustion chamber.

Figure 2:
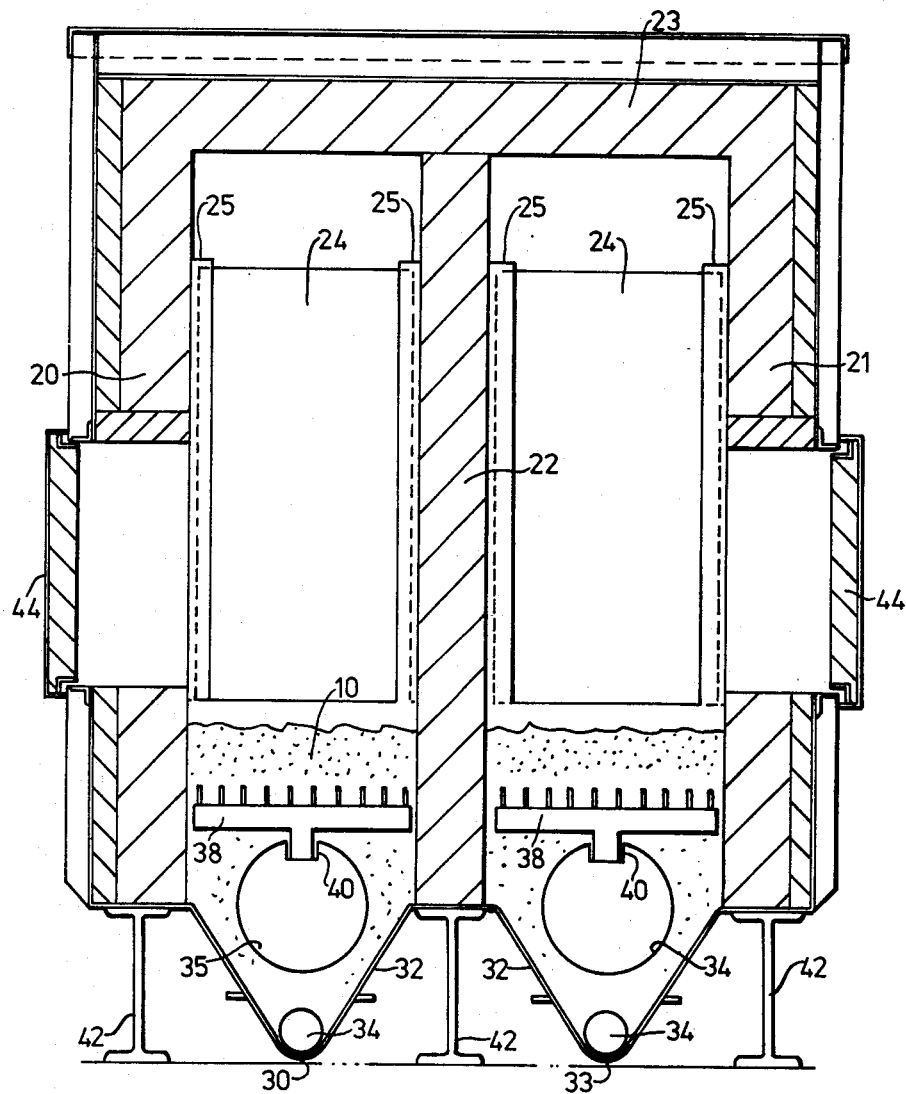
Figure 3:
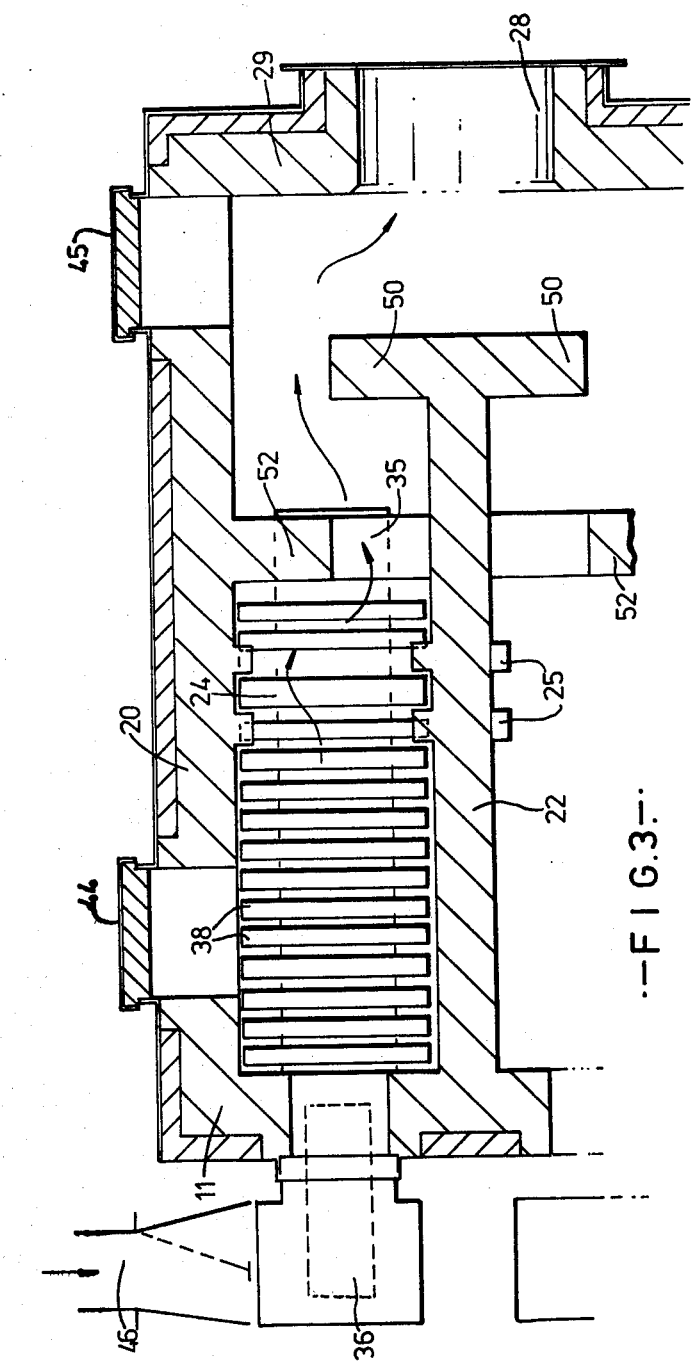

One embodiment of the invention will now be described, by way of example, with reference to the accompanying drawings, in which:

FIG. 1 is a section through a furnace chamber;
FIG. 2 is a section taken at right angles to that of FIG. 1 through a dual-chamber furnace;
FIG. 3 is an incomplete part sectional plan view of the furnace of FIG. 2 showing one furnace bed.

In FIG. 1, a bed of fluidisable incombustible particulate material, normally sand, shown at 10 extends from a refractory end wall 11 of the furnace that has a downwardly inclined solid fuel feed 12 to the upper surface of the bed from a hopper 13 via a sealed rotary feed 14. At its other end the bed is bounded by a riser 15 from the furnace base to a step 16 of refractory material. FIG. 2 shows two such furnace chambers within an overall furnace enclosure having bed bounding side walls 20, 21 and central partition 22, and a top plate or wall 23, all of refractory material.

This top wall is shown with reinforcements and support girders. Desirably it may be of any convenient prefabricated form to allow its ready removal and replacement both to facilitate repair and maintenance and allow shipping with parts temporarily stowed within the furnace chamber.

At a position closer to the step 16 than the end wall 11, but spaced therefrom, each combustion chamber has a transverse vertical wall 24, slid in between side wall protrusions 25, and extending from immediately above the bed material to a position short of the chamber top 23 which, at a position above the riser 15 to step 16 has a transverse short depending wall 26. Thus exhaust gases will be forced upwardly and then downwardly over the top of wall 25 and towards a furnace exhaust 28 substantially centrally of furnace end wall 29 spaced from and extending from below the step 15 to form an exhaust chamber 30, usually and preferably common to both combustion chambers.

The bottom of each furnace chamber has a V-shaped trough 32 within and to a total depth above which the incombustible bed material is disposed. At its base 33, each such trough has a material extraction worm screw 34 extending the full length of the trough below the bed. Above this worm screw 34 is a combined pre-heater burner housing and combustion promoting gas plenum chamber 35 of elongate cylindrical form also extending the full length of the bed. An oil or gas burner 36 is housed at one end 37 of the chamber and communication is provided at least at spaced positions along the length of the chamber with T-shaped gas distribution ducts or pipes 38 of which the cross pipes have a plurality of spaced gas release heads 39 extending upwardly therefrom.

It may be found convenient in building the furnace to provide a ledge at each side of each combustion chamber to support and/or locate ends of the T-shaped distribution members thereby allowing them to be simply lifted out for maintenance or repair purposes. The downwardly directed inlets of these T-pipes 38 may fit into re-entrantly edged holes 40 in the cylindrical chamber or, and perhaps preferably, are located in a channel thereof that may be closed except where it is to register with such a T-pipe, but will still allow ready removal of the chamber whenever required.

The entire furnace structure is shown supported on girder 42 located under side and partition walls thereof with the troughs disposed between them. Access doors 44 to the furnace chamber proper and 45 to the exhaust chamber are shown in the side walls.

In operation, combustion promoting gas, usually air, will be pressurised by a fan 46, and supplied to the burner mounting end of the chamber 35 for discharge into the bed of incombustible material. On start up, the burner 36 will be lit to heat the fluidising gas. When the bed material reaches the desired ignition temperature for fuel supplied via feed 12 that fuel will start to feed in and the burner 36 may be extinguished as normal furnace operation takes place.

It will be noted from FIG. 3 that the ends of partition wall 22 have transversely extending parts 50 to each side and side walls 20, 21 have extensions 52 at the position of riser 15 to further constrain the exhaust gas flow path and facilitate drop out of entrained particles. If desired collections of such particles on the shelf 16 may be returned to the bed by an inclined at least intermittently vibratable plate on the shelf 16.

It will be appreciated that the worm screw 34 could be replaced by other suitable feeding means, such as a pneumatic feed. It is also a valuable aspect of this invention to provide a return of fine extracted material to the combustion chamber. To that end, we show a screening system 60, upon which lumps of agglomerate material will collect and from which they may be removed, and a transfer conveyor 62 of any suitable type, e.g. pneumatic, scraper, bucket or the like, to take the fine material back to the combustion chamber at 64, which may be a sealed feed from a conveyor reception hopper. This is usually preferable to the conveyor 62 feeding directly into the solid fuel hopper 13, but that could be done if desired and any problems concerning wear and possibly erratic fuel dilution are within tolerable limits.

We also envisage that the chamber 30 could have gas delivery tubes taken directly from upper parts thereof instead of the gas discharge piping 38. Such tubes could be radial of a chamber 30 of generally circular cross-section as shown or could be medially bent, but should result in substantially even gas delivery across the width of the bed in the plane of FIG. 2.

Another possibly advantageous modification of the chamber 30 is to line it with refractory, typically a castable material, to limit expansion thereof, which could be significant given that the chamber itself will usually be of stainless steel. Then, short tubes welded to the upper part and ending in flanges can be coupled by bolting to flanges terminating the inlet tubes of the gas discharge piping sets 38. The flanges are readily made tolerant of differential expansion by slotting from edges between bolt holes.

I claim:

1. A fluid-bed furnace having, in a combustion chamber, a fluidised bed of incombustible particulate material within which fuel is to be burnt, and a removable elongate chamber having a single extension surrounded by and extending through the bed material from one end of the bed, said single extension housing a bed preheating burner extending from said one end of the chamber and said chamber being connected to spaced upstanding discharge pipes or ducts extending from upper parts of the chamber extension into the bed material to supply fluidising combustion promoting gas into the bed material substantially over the whole bed.

2. A fluid-bed furnace, according to claim 1, wherein the chamber is bodily removable from the furnace from said one end of the bed.

3. A fluid-bed furnace, according to claim 1, wherein the discharge pipes or ducts are spaced along a plurality of feed pipes or ducts extending transversely of a said chamber and in communication therewith.

4. A fluid-bed furnace, according to claim 1, wherein the chamber has a bed material supporting and chamber housing means of V- or U-section.

5. A fluid-bed furnace, according to claim 1, comprising at least two said combustion chambers formed by partitioning an overall structure so that the fluidisable beds thereof are in generally side-by-side relation.

6. A fluid-bed furnace, according to claim 5, wherein at least one adjacent pair of said combustion chamber shares a single exhaust outlet.

7. A fluid-bed furnace, according to claim 1, further comprising, at a position below normal fluidisation levels, material extraction means capable of accommodating coarse or agglomerated material.

8. A fluid-bed furnace, according to claim 7, comprising material extraction means disposed and operative along the lowest part of a trough.

9. A fluid-bed furnace, according to claim 8, wherein the extraction means comprises a worm screw.

10. A fluid-bed furnace, according to claim 5, wherein each combustion chamber has internal walling of height and location to force upward and then downward movement to exhaust gas flow from bed parts more remote from an exhaust position than said walling.

11. A fluid-bed furnace, according to claim 10, wherein the walling is located so that said downward movement is at least partially above an end part of the bed adjacent said exhaust position.

12. A fluid-bed furnace, according to claim 10, wherein said walling comprises a first transverse vertical wall extending from above the bed to a height less than the associated chamber and a second transverse vertical wall depending from the roof of that chamber at a position closer to said exhaust position than the first vertical wall.

* * * * *